United States Patent
Yamada et al.

(10) Patent No.: US 8,570,385 B2
(45) Date of Patent: Oct. 29, 2013

(54) IMAGE STABILIZATION CONTROL CIRCUIT AND IMAGING DEVICE HAVING IMAGE STABILIZATION CONTROL CIRCUIT

(75) Inventors: Yasuhisa Yamada, Aichi (JP); Yuuki Tashita, Gifu (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 310 days.

(21) Appl. No.: 12/327,235

(22) Filed: Dec. 3, 2008

(65) Prior Publication Data

US 2009/0160954 A1   Jun. 25, 2009

(30) Foreign Application Priority Data

Dec. 21, 2007   (JP) .................................. 2007-330623

(51) Int. Cl.
*H04N 5/228*   (2006.01)

(52) U.S. Cl.
USPC ................. 348/208.6; 348/208.3; 348/208.99

(58) Field of Classification Search
USPC ......... 348/208.6, 207.99, 187, 208.1–208.15; 396/55
See application file for complete search history.

(56) References Cited

U.S. PATENT DOCUMENTS

| | | | |
|---|---|---|---|
| 5,459,311 A | 10/1995 | Brosnan | |
| 5,541,508 A | 7/1996 | Suzuki | |
| 5,566,093 A | 10/1996 | White | |
| 5,634,145 A | 5/1997 | Ohishi et al. | |
| 5,822,623 A * | 10/1998 | Urata et al. ..................... | 396/52 |
| 5,893,054 A | 4/1999 | White | |
| 6,233,009 B1 | 5/2001 | Morofuji et al. | |
| 6,501,399 B1 | 12/2002 | Byrd | |
| 7,460,154 B2 | 12/2008 | Kawahara | |
| 7,502,050 B2 * | 3/2009 | Hatanaka et al. .......... | 348/208.3 |
| 7,640,741 B2 | 1/2010 | Hara | |
| 7,881,402 B2 | 2/2011 | Gao et al. | |

(Continued)

FOREIGN PATENT DOCUMENTS

| | | |
|---|---|---|
| CN | 100559253 C | 11/2009 |
| EP | 1507408 A2 | 2/2005 |

(Continued)

OTHER PUBLICATIONS

Office Action for Chinese Application 200810182174.9 issued Apr. 22, 2010 with English translation.
Office Action for Korean Application No. 10-2008-119661 issued Mar. 19, 2010 with English translation.
Office Action for Chinese Application No. 200810177436.2 issued Apr. 29, 2010 with English translation.

(Continued)

*Primary Examiner* — Joel Fosselman
(74) *Attorney, Agent, or Firm* — Cantor Colburn LLP

(57) ABSTRACT

A image stabilization control circuit is provided which comprises at least one analog-to-digital converter circuit which converts an output signal of a vibration detection element which detects vibration of an imaging device and an output signal of a position detection element which detects a position of an optical component, into digital signals, and a logic circuit which generates a control signal which drives the optical component based on the output signal of the vibration detection element which is digitized by the analog-to-digital converter circuit and the output signal of the position detection element which is digitized by the analog-to-digital converter circuit, wherein an abnormality of the vibration detection element is judged based on an amplitude of the output signal from the vibration detection element which is converted into the digital signal by the analog-to-digital converter circuit.

9 Claims, 3 Drawing Sheets

(56) References Cited

U.S. PATENT DOCUMENTS

| | | | |
|---|---|---|---|
| 2001/0038749 A1* | 11/2001 | Imada | 396/55 |
| 2002/0118844 A1 | 8/2002 | Welsh et al. | |
| 2004/0052513 A1 | 3/2004 | Ohkawara et al. | |
| 2004/0056963 A1 | 3/2004 | Ishikawa | |
| 2005/0018051 A1* | 1/2005 | Tomita et al. | 348/208.4 |
| 2005/0200712 A1 | 9/2005 | Uenaka | |
| 2005/0201741 A1 | 9/2005 | Moriya | |
| 2006/0072912 A1 | 4/2006 | Momochi et al. | |
| 2007/0103032 A1 | 5/2007 | Yamashita | |
| 2007/0223755 A1 | 9/2007 | Salvetti et al. | |
| 2008/0037970 A1* | 2/2008 | Saito et al. | 396/55 |
| 2009/0141134 A1 | 6/2009 | Kamiya et al. | |
| 2009/0160953 A1 | 6/2009 | Nagata et al. | |
| 2010/0214426 A1 | 8/2010 | Kimura | |
| 2011/0043646 A1 | 2/2011 | Watanabe et al. | |

FOREIGN PATENT DOCUMENTS

| | | | |
|---|---|---|---|
| JP | 1-293739 A | 11/1989 | |
| JP | 2-20925 A | 1/1990 | |
| JP | 2-262843 A | 10/1990 | |
| JP | 6-313718 A | 11/1994 | |
| JP | 7-325330 A | 12/1995 | |
| JP | 8-76061 A | 3/1996 | |
| JP | 8-79598 A | 3/1996 | |
| JP | 8-240831 A | 9/1996 | |
| JP | 10-213832 A | 8/1998 | |
| JP | 11-98420 A | 4/1999 | |
| JP | 2000-13671 A | 1/2000 | |
| JP | 2000-250086 A | 9/2000 | |
| JP | 2000-356733 A | 12/2000 | |
| JP | 2004-328606 A | 11/2004 | |
| JP | 2005-115253 A | 4/2005 | |
| JP | 2007-101672 A | 4/2007 | |
| JP | 2007-127754 A | 5/2007 | |
| JP | 2007-206382 A | 8/2007 | |

OTHER PUBLICATIONS

Office Action for Korean Application No. 10-2008-119547 issued Apr. 1, 2010 with English translation.
Office Action for Korean Application No. 10-2008-119384 issued Apr. 1, 2010 with English translation.
U.S. Office Action for U.S. Appl. No. 12/343,646 dated Apr. 22, 2011.
U.S. Office Action for U.S. Appl. No. 12/341,721 dated May 27, 2011.
Aronhime, P. 1999. All-Pass Filters. Wiley Encyclopedia of Electrical and Electronics Engineering.
U.S. Office Action for U.S. Appl. No. 12/327,293 dated Mar. 17, 2011.
Office Action for Korean Patent Application No. 10-2010-58542 mailed Sep. 17, 2010 with English translation.
Office Action for Korean Patent Application No. 10-2008-119661 mailed Sep. 17, 2010 with English translation.
United States Patent & Trademark Office Official communication, Office Action for U.S. Appl. No. 12/341,721, dated Dec. 8, 2011.
Notice of Grounds for Rejection for Japanese Patent Application No. 2007-332465, mailed Jun. 5, 2012, with English translation.
Notice of Grounds for Rejection for Patent Application No. 2007-332466, mailed Jun. 5, 2012, with English translation.
Notice of Grounds for Rejection for Japanese Patent Application Serial No. 2007-330623, mailed Feb. 14, 2012, with English translation.
Notice of Grounds for Rejection for Japanese Patent Application Serial No. 2007-330624, mailed Feb. 14, 2012, with English translation.
Japanese Office Action, Decision of Rejection for Japanese patent application No. 2007-330623 mailing date of Sep. 11, 2012 with English translation.
Japanese Office Action, Decision of Rejection, for Japanese patent application No. 2007-330624 mailing date of Sep. 11, 2012 with English translation.

* cited by examiner

IMAGE STABILIZATION CONTROL CIRCUIT AND IMAGING DEVICE HAVING IMAGE STABILIZATION CONTROL CIRCUIT

CROSS-REFERENCE TO RELATED APPLICATION

The disclosure of Japanese Patent Application No. 2007-330623 filed on Dec. 21, 2007 including specification, claims, drawings, and abstract is incorporated herein by reference.

BACKGROUND OF THE INVENTION

1. Field of the Invention

The present invention relates to a image stabilization control circuit which is equipped in an imaging device.

2. Description of the Related Art

Recently, imaging devices such as a digital still camera and a digital video camera realize improved image quality by increasing a number of pixels of an imaging element provided in the imaging device. On the other hand, as another method of realizing improved image quality for the imaging device, it is desired for the imaging device to have a vibration correction function in order to prevent vibration of an image of an object caused by vibration of the hand holding the imaging device.

More specifically, a detection element such as a gyro sensor is provided in an imaging device, and optical components such as the lens and the imaging element are driven according to an angular velocity component caused by vibration of the imaging device, to prevent vibration of the object image. With this structure, even if the imaging device is vibrated, the component of the vibration is not reflected in the obtained image signal, and an image signal having no image vibration and a high image quality can be acquired.

FIG. 4 is a block diagram of a image stabilization control circuit 100 of the related art which is used for realizing the vibration correction function. The image stabilization control circuit 100 is provided in an imaging device, and operates according to control of a main control circuit (not shown) provided in the imaging device. The image stabilization control circuit 100 is connected to a position detection element 102, a lens driving element 104, and a vibration detection element 106.

The position detection element 102 detects a position of a lens which is used in the imaging device. A hall element may be used as the position detection element 102. The hall element produces an inductive current corresponding to an absolute position of the lens and outputs a voltage signal to the image stabilization control circuit 100. A voice coil motor may be used as the lens driving element 104. The image stabilization control circuit 100 controls a position of a movable coil of the voice coil motor, that is, a position of the lens with respect to an optical axis which forms a reference, by adjusting the value of the voltage to be applied to the lens driving element 104. The lens driving element 104 drives the lens within a plane which is perpendicular to the reference optical axis of the imaging device. The vibration detection element 106 detects vibration of the imaging device and outputs the result of the detection to the image stabilization control circuit 100. A gyro sensor may be employed as the vibration detection element 106. The vibration detection element 106 generates an angular velocity signal corresponding to the vibration applied to the imaging device and outputs the angular velocity signal to the image stabilization control circuit 100.

For each of the position detection element 102, the lens driving element 104, and the vibration detection element 106, it is desired for at least two elements to be provided. For example, a plurality of elements are provided corresponding to a horizontal component and a vertical component in a plane perpendicular to the optical axis of the imaging device, and the lens position detection, lens movement, and vibration detection of the imaging device are executed.

Next, the image stabilization control circuit 100 will be described in detail. The image stabilization control circuit 100 comprises a servo circuit 10, a lens driver 12, an analog-to-digital converter circuit (ADC) 14, a CPU 16, and a digital-to-analog converter circuit (DAC) 18.

The servo circuit 10 generates a signal for controlling the lens driving element 104 according to the voltage signal which is output from the position detection element 102. The servo circuit 10 comprises an analog filter circuit including an external resistor element, a capacitor, etc., and generates a signal which controls the lens driving element 104 such that the optical axis of the lens matches the center of the imaging element provided in the imaging device. The lens driver 12 generates a lens driving signal which drives the lens driving element 104 based on the signal which is output from the servo circuit 10.

The ADC 14 converts the analog angular velocity signal which is output from the vibration detection element 106 into a digital signal. The CPU 16 generates an angle signal which indicates an amount of movement of the imaging device based on the digital angular velocity signal. The CPU 16 is connected to a memory (not shown) and executes the generation process of the angle signal based on software stored in the memory. The DAC 18 converts the digital angle signal generated by the CPU 16 into an analog signal.

The servo circuit 10 generates a signal which controls the lens driving element 104 according to a signal in which the analog angle signal which is output from the DAC 18 and the voltage signal which is output from the position detection element 102 are added. In other words, in order to prevent vibration of an object image due to hand vibration, the position of the lens is changed based on the angle signal indicating the amount of movement of the imaging device, to inhibit vibration of the image of the object on the imaging element. With this structure, the vibration of the object image due to the vibration of the hand can be inhibited and an image signal of high image quality can be obtained.

In order to improve a processing speed of the image stabilization control circuit, it is desired to replace the servo circuit, the lens driver, and the processor circuit of the vibration detection signal with logic circuits which can process digitally. In addition, because the image stabilization control circuit is equipped in an imaging element such as a digital camera or the like or a lens module of the imaging element, the size must be minimized even when logic circuits are employed.

In addition, it is desired to incorporate, into the image stabilization control circuit, a function to judge whether or not the vibration detection element such as a gyro sensor equipped in the imaging device is normally functioning, during manufacturing or the like of the imaging device.

SUMMARY OF THE INVENTION

According to one aspect of the present invention, there is provided a image stabilization control circuit which drives an optical component or an imaging element of an imaging device according to vibration, and which reduces the effect of the vibration on imaging, the image stabilization control circuit comprising at least one analog-to-digital converter circuit which converts an output signal of a vibration detection element which detects vibration of the imaging device into a digital signal, and a logic circuit which generates a control signal which drives the optical component or the imaging element, based on the output signal of the vibration detection element which is digitized by the analog-to-digital converter circuit. The image stabilization control circuit further comprises a judgment circuit which judges an abnormality of the vibration detection element based on an amplitude of the output signal from the vibration detection element which is converted into the digital signal by the analog-to-digital converter circuit.

BRIEF DESCRIPTION OF THE DRAWINGS

Preferred embodiments of the present invention will be described in detail based on the following figures, wherein.

DESCRIPTION OF THE PREFERRED EMBODIMENT

Figure 1:
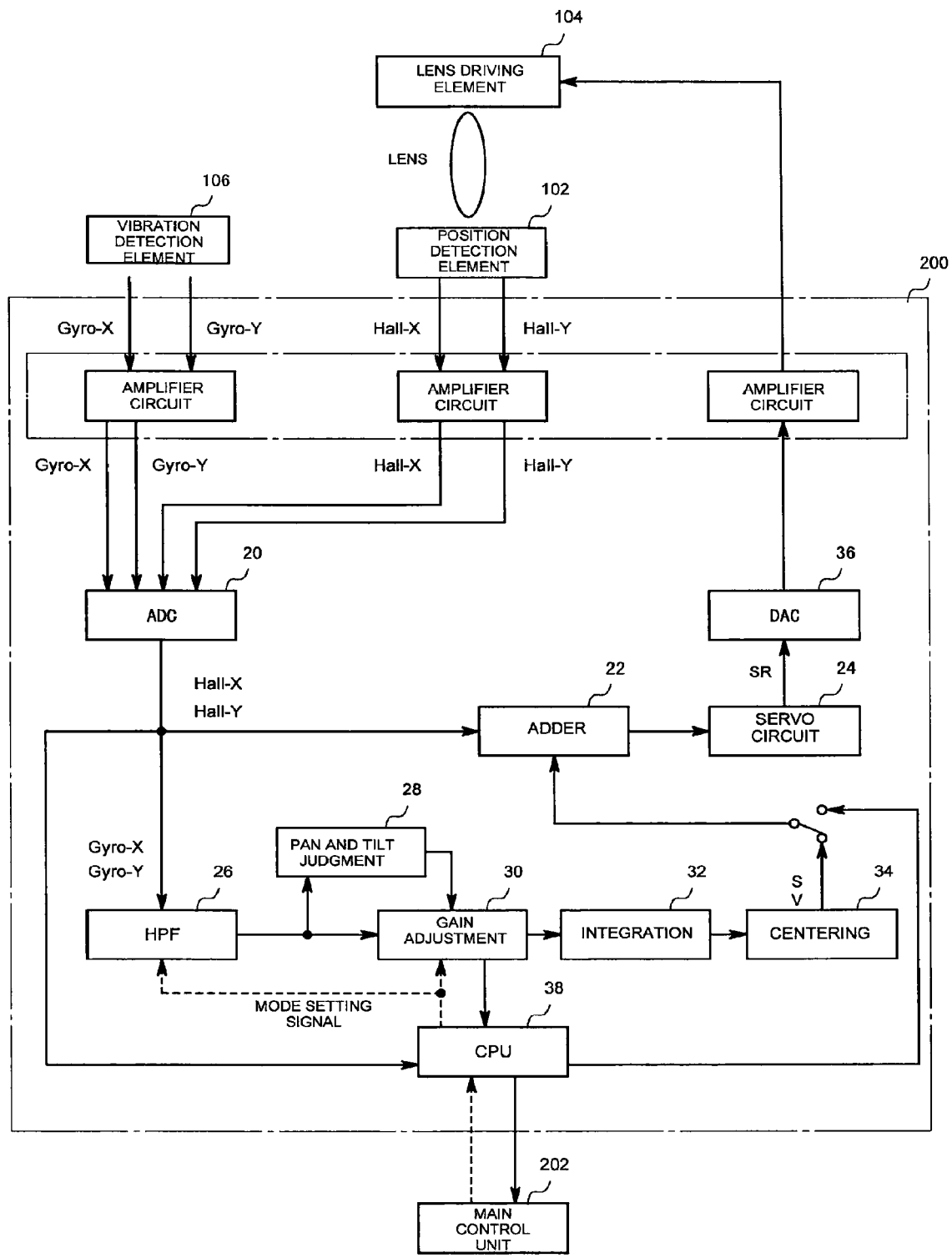
FIG. 1 is a diagram showing a structure of a image stabilization control circuit in a preferred embodiment of the present invention.

As shown in a functional block diagram of FIG. 1, a image stabilization control circuit 200 in a preferred embodiment of the present invention comprises an analog-to-digital converter circuit (ADC) 20, an adder circuit 22, a servo circuit 24, a high-pass filter (HPF) 26, a pan and tilt judgment circuit 28, a gain adjustment circuit 30, an integration circuit 32, a centering processor circuit 34, a digital-to-analog converter circuit (DAC) 36, and a CPU 38.

The image stabilization control circuit 200 is connected to a position detection element 102, a lens driving element 104, and a vibration detection element 106. These elements are similar to those described above with reference to the related art. In other words, the position detection element 102 is provided for at least two axes so that the position of the lens driven by the lens driving element 104 can be measured in a manner to allow at least an orthogonal conversion, and the vibration detection element 106 is also provided for at least two axes so that the components of the vibration can be orthogonally converted along two axes in a yaw direction and a pitch direction.

The present embodiment is described with reference to an example case in which the position detection element 102 and the vibration detection element 106 are provided so that the lens position and vibration can be detected for the yaw direction (X-axis direction) and the pitch direction (Y-axis direction) of the imaging device. In the following description, the output signals of the position detection element 102 and the vibration detection element 106 are processed, such as an addition between the X-axis components of the output signals and between the Y-axis components of the output signals, and the lens position is controlled in the yaw direction (X-axis direction) and the pitch direction (Y-axis direction) based on the processed signals.

An operation to move the imaging device in a horizontal direction (yaw direction) corresponding to a movement of the object or the like is called a pan operation and an operation to move the imaging device in a vertical direction (pitch direction) is called a tilt operation.

The ADC 20 converts an analog voltage signal which is output from the position detection element 102, for example, the hall element, in to a digital signal. The hall element generates an inductive current corresponding to a magnetic force using a magnet which is fixed on the lens. In other words, the hall element outputs a voltage signal which indicates the position of the lens according to a distance to the lens, and the ADC 20 converts the voltage signal into a digital signal and outputs the converted signal as a position signal. The ADC 20 has a structure in which a signal which indicates a reference, for example, a digital value of "0", is output when the optical axis of the lens and the center of the imaging element provided in the imaging device match.

The ADC 20 also converts an analog angular velocity signal which is output from the vibration detection element 106, for example, a gyro sensor, into a digital signal. In other words, the ADC 20 digitizes the output signals from the position detection element 102 and the vibration detection element 106 in a time divisional manner and outputs the converted signals.

More specifically, the ADC 20 digitizes and outputs a signal of an X-axis component of vibration detected by the vibration detection element 106 (Gyro-X), a signal of a Y-axis component of vibration (Gyro-Y), a signal of an X-axis component of a position of the lens detected by the position detection element 102 (Hall-X), and a signal of a Y-axis component of the position (Hall-Y). The ADC 20 outputs the signals Gyro-X and Gyro-Y to the HPF 26 and the signals Hall-X and Hall-Y to the adder circuit 22.

During a normal imaging mode, the HPF 26 removes a direct current component included in the angular velocity signal, extracts a high-frequency component of the angular velocity signal in which the vibration of the imaging device is reflected, and outputs to the pan and tilt judgment circuit 28 and to the gain adjustment circuit 30. During the abnormality judgment mode of the vibration detection element 106, on the other hand, the HPF 26 outputs the input signal without any processing to the pan and tilt judgment circuit 28 and to the gain adjustment circuit 30.

The HPF 26 receives a mode setting signal from the CPU 38 and is exclusively set in one of a normal imaging mode and an abnormality judgment mode. A tap filter or the like, which is one type of digital filter, may be employed for the HPF 26. The filter characteristic may be switched between the normal imaging mode and the abnormality judgment mode by changing each tap coefficient of the tap filter.

The pan and tilt judgment circuit 28 detects a pan operation and a tilt operation of the imaging device based on the angular velocity signal which is output by the HPF 26. The pan and tilt judgment circuit 28 judges that the imaging device is in the pan operation or in the tilt operation when a state is detected where the angular velocity signal is greater than or equal to a predetermined value for a period of a predetermined length.

During the imaging, the gain adjustment circuit 30 changes an amplification of the angular velocity signal which is output from the HPF 26 according to the judgment result by the pan and tilt judgment circuit 28, and a signal which is amplified by the changed amplification is output. For example, during the periods other than the pan operation period and the tilt operation period, the gain adjustment circuit 30 adjusts the gain so that the intensity of the angular velocity signal which is output from the HPF 26 is maintained. During the pan operation or the tilt operation, the gain adjustment circuit 30 adjusts the gain so that the intensity of the angular velocity signal which is output from the HPF 26 is attenuated and the output becomes zero.

During the abnormality judgment mode of the vibration detection element 106, on the other hand, the gain adjustment circuit 30 amplifies the angular velocity signal which is output from the HPF 26 and outputs to the CPU 38, regardless of the judgment result of the pan and tilt judgment circuit 28.

The gain adjustment circuit 30 is exclusively set to one of the normal imaging mode and the abnormality judgment mode in response to a mode setting signal from the CPU 38.

The integration circuit 32 integrates the angular velocity signals (Gyro-X and Gyro-Y) which are output from the HPF 26 and generates angle signals which indicate an amount of movement of the imaging device. Preferably, the integration circuit 32 comprises a digital filter (not shown), and determines the angle signal, that is, the amount of movement of the imaging device, by applying a filter process according to a filter coefficient which is set in a register (not shown), to delay the angular velocity signal by 90°.

When the vibration correction process is applied in the imaging device, there may be cases where the position of the lens is gradually moved apart from the reference position as the vibration correction process is continuously executed, and the position of the lens may reach a point near a limit point of the movable range of the lens. In this case, the continuation of the vibration correction process may result in a situation where the lens may be moved in a certain direction, but not in the other direction. The centering processor circuit 34 is provided in order to prevent this phenomenon.

The adder circuit 22 adds the position signal (Hall-X) which is output from the ADC 20 and the vibration component signal (SV-X) having the phase adjusted by the centering processor circuit 34 and also adds the position signal (Hall-Y) which is output from the ADC 20 and the vibration component signal (SV-Y) having the phase adjusted by the centering processor circuit 34, and outputs the resulting signals to the servo circuit 24.

The servo circuit 24 generates a correction signal SR for controlling the driving of the lens driving element 104, according to the output signals from the adder circuit 22. The servo circuit 24 comprises a register and a digital filter, and applies a filter process using a filter coefficient which is stored in the register.

The DAC 36 converts the digital correction signal SR into an analog signal. Based on the correction signal SR which is converted into an analog signal by the DAC 36, the lens driving element 104 drives the lens of the imaging device in the X-axis direction and in the Y-axis direction.

The CPU 38 integrally controls the image stabilization control circuit 200. The CPU 38 sets filter coefficients, gain values, etc. of various sections (such as tap coefficient of the tap filter) of the image stabilization control circuit 200. The CPU 38 also receives the mode setting signal from a main control unit (main CPU or the like) 202 of the imaging device which is provided outside of the image stabilization control circuit 200, and sets the image stabilization control circuit 200 to the normal imaging mode or the abnormality judgment mode of the vibration detection element.

<Vibration Correction Process during Imaging>

Movement control of the lens for correcting the vibration of the object image due to vibration of the hand using the image stabilization control circuit 200 will now be described.

When the vibration correction process is executed during the normal imaging, the CPU 38 outputs a mode setting signal, which sets a normal imaging mode, to the HPF 26 and to the gain adjustment circuit 30, and the HPF 26 and the gain adjustment circuit 30 are set in the normal imaging mode.

First, a case will be described in which there is no vibration of the object image due to hand vibration. Because the position of the lens driven by the lens driving element 104 is such that the optical axis of the lens and the center of the imaging element provided in the imaging device match, the ADC 20 outputs digital position signals (Hall-X and Hall-Y) which indicate "0". The servo circuit 24 outputs a correction signal SR which controls the lens driving element 104 to maintain the current lens position when the values of the position signals (Hall-X and Hall-Y) are "0".

When, on the other hand, the position of the lens and the center of the imaging element do not match, the ADC 20 outputs digital position signals (Hall-X and Hall-Y) showing values different from "0". The servo circuit 24 outputs a correction signal SR which controls the lens driving element 104 so that the values of the position signals (Hall-X and Hall-Y) become "0", according to the values which are output from the ADC 20. With repetition of the above-described operation, the image stabilization control circuit 200 controls the position of the lens so that the position of the lens and the center of the imaging element match.

Next, a case will be described in which vibration of the object image is caused due to the vibration of the hand. Because the position of the lens driven by the lens driving element 104 is such that the optical axis of the lens and the center of the imaging element provided in the imaging device match, the ADC 20 outputs digital position signals (Hall-X and Hall-Y) indicating "0". On the other hand, because the imaging device is moved due to the vibration of the hand, the integration circuit 32 and the centering processor circuit 34 output vibration component signals (SV-X and SV-Y) indicating an amount of movement of the imaging device.

The servo circuit 24 generates a correction signal SR according to a signal in which the position signal (Hall-X) indicating "0" which is output from the ADC 20 and the vibration component signal (SV-X) which is output from the centering processor circuit 34 are added. In this case, although the position signal (Hall-X) is "0", because the vibration component signal (SV-X) which is not "0" is added, the servo circuit 24 generates a correction signal SR which moves the lens. The lens driving element 104 for the X-axis is controlled according to the correction signal SR. Similarly, the servo circuit 24 generates a correction signal SR according to a signal in which the position signal (Hall-Y) indicating "0" which is output from the ADC 20 and the vibration component signal (SV-Y) which is output from the centering processor circuit 34 are added. In this case, although the position signal (Hall-Y) is "0", because the vibration component signal (SV-Y) which is not "0" is added, the servo circuit 24 generates the correction signal SR which moves the lens. The lens driving element 104 for the Y-axis is controlled according to the correction signal SR. Because the lens driving element 104 moves the lens based on the correction signal SR which is output from the servo circuit 24, the imaging element provided in the imaging device can obtain a signal in which the vibration of the object image due to the vibration of the hand is inhibited. By repeating such a control, the image stabilization control circuit 200 realizes the vibration correction control.

In the present embodiment, a structure is employed in which, when the angle signal indicating the amount of movement of the imaging device is generated based on the angular velocity signal obtained from the vibration detection element 106, the angle signal is generated using the HPF 26, the integration circuit 32, and the centering processor circuit 34. Because of this structure, it is not necessary to use the CPU 38 for generation of the angle signal, resulting in a reduction of the power consumption in the image stabilization control circuit 200.

In addition, in the present embodiment, a structure in employed in which the image stabilization control circuit 200 comprises the HPF 26, the integration circuit 32, and the centering processor circuit 34. With this structure, it is possible to reduce the circuit area compared to a structure in which the above-described processes are executed by the CPU 38. In this manner, it is possible to reduce the cost of the semiconductor chip on which the image stabilization control circuit 200 is equipped.

<Abnormality Judgment Process of Vibration Detection Element>

Next, an abnormality judgment process of the vibration detection element 106 using the image stabilization control circuit 200 will be described. When the abnormality judgment process of the vibration detection element 106 is executed, the CPU 38 outputs a mode setting signal which sets the abnormality judgment mode to the HPF 26 and to the gain adjustment circuit 30, and the HPF 26 and the gain adjustment circuit 30 are set in the abnormality judgment mode. During the abnormality judgment process of the vibration detection element 106, the imaging device is fixed so that there is no vibration.

Figure 2:
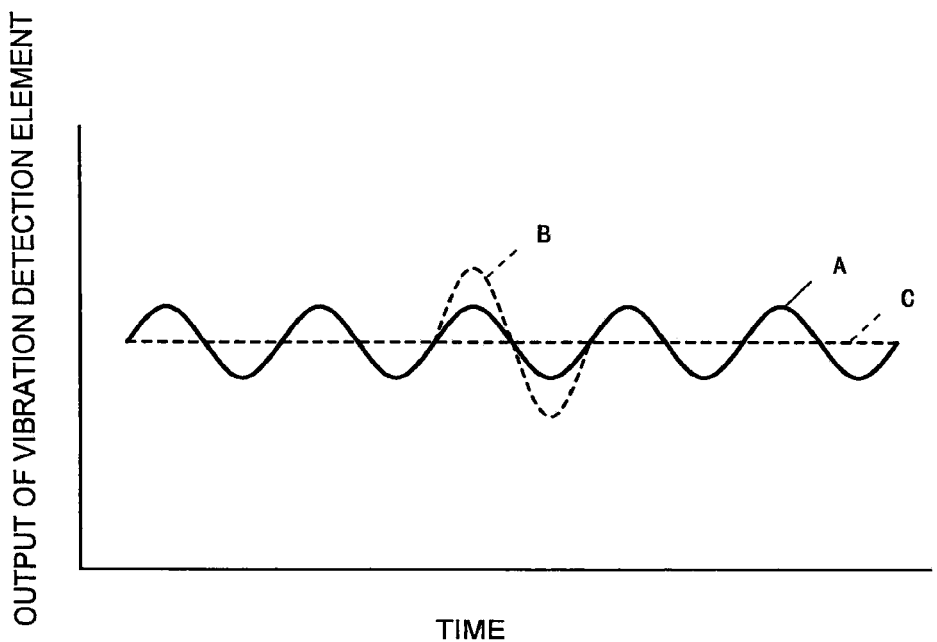
FIG. 2 is a diagram showing output signals of the vibration detection element during normal time and abnormal time in a preferred embodiment of the present invention.

Even when the imaging device is fixed and the vibration detection element 106 does not detect vibration, as shown by a line A in FIG. 2, a normally functioning vibration detection element 106 continues to output a weak vibration signal. When, on the other hand, the vibration detection element 106 is not normally functioning or the vibration detection element 106 is not properly connected to the image stabilization control circuit 200, noise having a larger amplitude than at the normal time is superposed as shown by a line B of FIG. 2, or the amplitude is smaller compared to the normal time as shown by a line C of FIG. 2.

The output signals (Gyro-X and Gyro-Y) from the vibration detection element 106 are digitized by the ADC 20 and input to the HPF 26. In the abnormality judgment mode, the HPF 26 is disabled, and the input signals are output to the pan and tilt judgment circuit 28 and to the gain adjustment circuit 30 without any processing. The gain adjustment circuit 30 amplifies the output signal from the vibration detection element 106 by a predetermined gain value (a gain value which is larger than that of the normal imaging mode) regardless of the judgment result by the pan and tilt judgment circuit 28, and outputs to the CPU 38.

Figure 3:
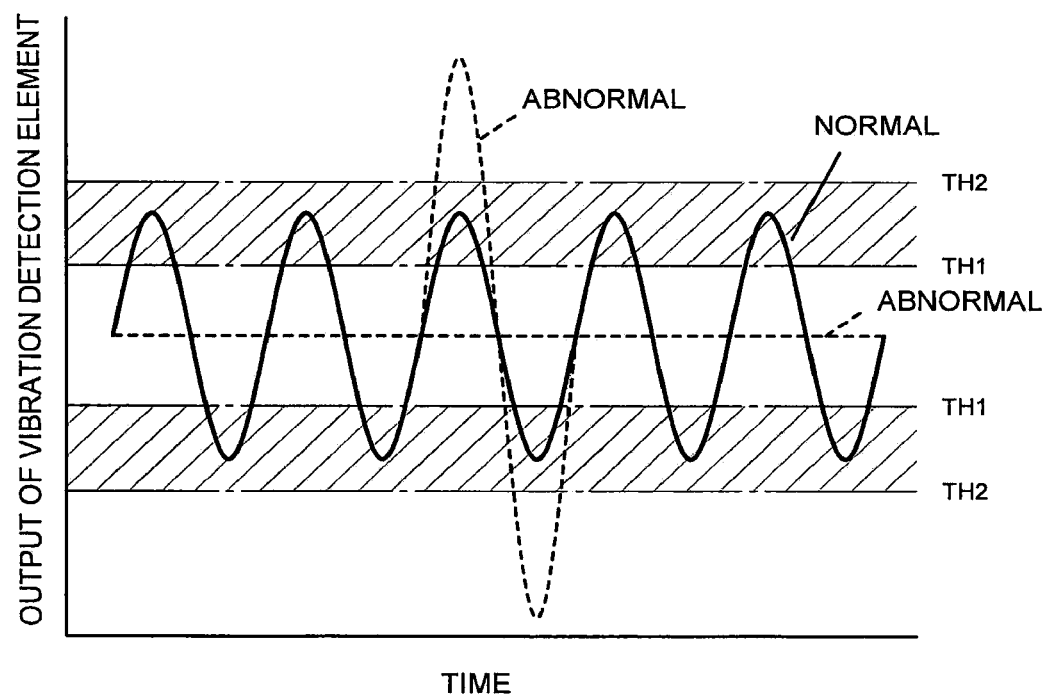
FIG. 3 is a diagram showing an abnormality judgment process of the vibration detection element in a preferred embodiment of the present invention.
Figure 4:
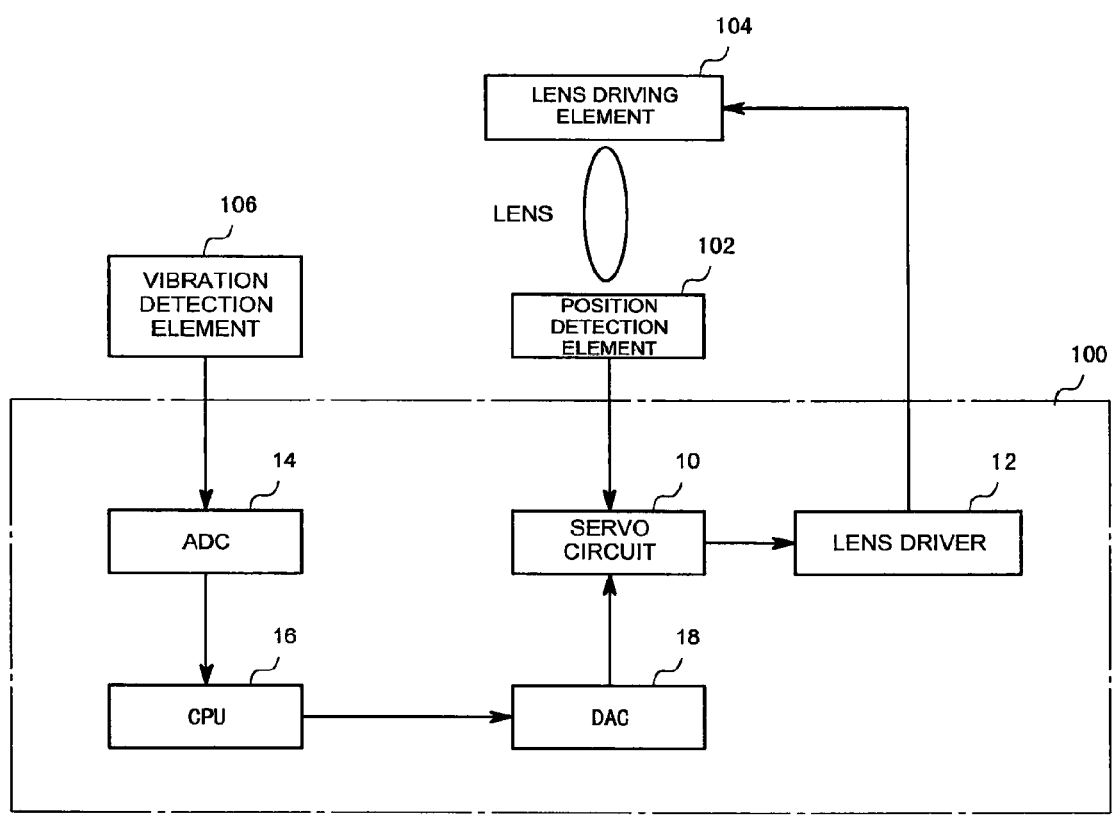
FIG. 4 is a diagram showing a structure of a image stabilization control circuit in the related art.

The CPU 38 receives the output signal from the vibration detection element 106 which is amplified by the gain adjustment circuit 30, and executes an abnormality judgment process based on an amplitude of the input signal. For example, when the amplitude of the input signal is in a range of greater than a first threshold value TH1 and less than a second threshold value TH2 (a hatched range in FIG. 3) as shown in FIG. 3, the CPU 38 judges that the vibration detection element 106 is normal. When, on the other hand, the amplitude of the input signal is in the range of less than or equal to the first threshold value TH1 or in the range of greater than or equal to the second threshold value TH2 (a non-hatched range in FIG. 3), the CPU 38 judges that the vibration detection element 106 is abnormal. Although FIG. 3 is drawn with an analog signal in order to facilitate the explanation, the signals are actually digital signals.

By disabling the HPF 26 and outputting the input signal to the gain adjustment circuit 30 without further processing as in the present embodiment, it is possible to directly amplify the weak vibration signal of the vibration detection element 106 during the abnormality judgment mode, and to more accurately execute the abnormality judgment process, and thus such a configuration is preferable. Alternatively, a configuration to set the filter characteristic of the HPF 26 during the abnormality judgment mode to transmit lower frequency components than the normal imaging mode is also effective, or the filter characteristic may be set similar to the normal imaging mode.

The CPU 38 outputs the judgment result to the external main control unit (main CPU or the like) 202 as necessary.

As described, in the image stabilization control circuit 200, the abnormality judgment process of the vibration detection element 106 can be executed. With this structure, for example, it is possible to judge whether or not the vibration detection element such as the gyro sensor which is equipped in the imaging device is normal, prior to shipping of the imaging device.

In the present embodiment, a configuration is employed in which the gain value of the gain adjustment circuit 30 is set greater than the normal imaging mode. Alternatively, it is also possible to set a greater gain value for the amplifier circuit between the vibration detection element 106 and the ADC 20 than that of the normal imaging mode. In addition, although in the present embodiment, the abnormality is judged based on the signal amplified by the gain adjustment circuit 30, the present invention is not limited to such a configuration, and any signal after the digitization by the ADC 20 may be used. For example, the output signal of the ADC 20 may be directly output to the CPU 38, and the abnormality may be judged based on this signal.

Moreover, although in the present embodiment, a configuration is employed in which the hall element, the voice coil motor, and the gyro sensor are employed as the position detection element 102, the lens driving element 104, and the vibration detection element 106, the present invention is not limited to such a configuration. For example, a piezo element may be used for the lens driving element 104. In addition, for the vibration detection element 106, a sensor which detects acceleration in a linear direction may be used and the vibration of the imaging device may be detected based on the acceleration signal.

Although in the present embodiment, a lens shift method is employed in which the vibration correction process is executed by driving the lens, the present invention is not limited to such a configuration. For example, the present invention can be applied to a CCD shift method in which the imaging element such as the CCD element is shifted according to the vibration of the imaging device. In this case, the position detection element 102 may be set as an element which detects the position of the imaging element and the lens driving element 104 may be set as an element which drives the imaging element.

What is claimed is:

1. A image stabilization control circuit which drives an optical component or an imaging element of an imaging device according to vibration and which reduces an influence of the vibration on imaging, the image stabilization control circuit comprising:

at least one analog-to-digital converter circuit which converts an output signal of a vibration detection element which detects vibration of the imaging device into a digital signal; and a logic circuit which generates a control signal which drives the optical component or the imaging element, based on the output signal of the vibration detection element which is digitized by the analog-to-digital converter circuit, the logic circuit comprising:
 a pan and tilt judgment circuit which judges a pan operation or a tilt operation of the imaging device;
 a gain adjustment circuit which adjusts, during imaging, a gain value which amplifies the output signal from the vibration detection element according to a judgment result of the pan and tilt judgment circuit and sets, when the vibration detection element is abnormal, a predetermined value as the gain value which amplifies the output signal from the vibration detection element, regardless of the judgment result of the pan and tilt judgment circuit;
a judgment circuit which judges that, if an output value of the vibration detection element obtained when the imaging device is static is not within a normal value range, the vibration detection element is abnormal, based on an amplitude of a signal obtained by amplifying, with the gain value, the output signal from the vibration detection element which is converted to the digital signal by the analog-to-digital converter circuit.

2. The image stabilization control circuit according to claim 1, wherein
the logic circuit receives the output signal from the vibration detection element which is digitized by the analog-to-digital converter circuit and outputs only a signal of greater than or equal to a first frequency to the gain adjustment circuit, during the imaging, and
the logic circuit further comprises a high-pass filter which outputs, to the gain adjustment circuit, only a signal of greater than or equal to a second frequency which is lower than the first frequency, of the output signal from the vibration detection element which is digitized by the analog-to-digital converter circuit, during the abnormality judgment of the vibration detection element.

3. The image stabilization control circuit according to claim 2, wherein
the vibration detection element is judged as being abnormal when the amplitude of the output signal from the vibration detection element is less than or equal to a first threshold value or is greater than or equal to a second threshold value which is greater than the first threshold value.

4. The image stabilization control circuit according to claim 2, wherein
the abnormality of the vibration detection element is judged based on the amplitude of the output signal which is obtained by amplifying the output signal of the vibration detection element with a gain value which is greater than that during the imaging.

5. The image stabilization control circuit according to claim 1, wherein
the vibration detection element is judged as being abnormal when the amplitude of the output signal from the vibration detection element is less than or equal to a first threshold value or is greater than or equal to a second threshold value which is greater than the first threshold value.

6. The image stabilization control circuit according to claim 1, wherein
the vibration detection element is judged as being abnormal when the amplitude of the output signal from the vibration detection element is less than or equal to a first threshold value or is greater than or equal to a second threshold value which is greater than the first threshold value.

7. The image stabilization control circuit according to claim 1, wherein
the abnormality of the vibration detection element is judged based on the amplitude of the output signal which is obtained by amplifying the output signal of the vibration detection element with a gain value which is greater than that during the imaging.

8. The image stabilization control circuit according to claim 1, wherein
the abnormality of the vibration detection element is judged based on the amplitude of the output signal which is obtained by amplifying the output signal of the vibration detection element with a gain value which is greater than that during the imaging.

9. An imaging device comprising the image stabilization control circuit according to claim 1, comprising:
the vibration detection element; and
a driving element which is connected to the image stabilization control circuit and which drives the optical component or the imaging element according to the control signal.

* * * * *